US012710957B2

(12) United States Patent
Imms

(10) Patent No.: US 12,710,957 B2
(45) Date of Patent: Aug. 18, 2026

(54) SOFTWARE DEVELOPMENT TOOL INSTALLATION AND COMMAND ROUTING

(71) Applicant: Microsoft Technology Licensing, LLC, Redmond, WA (US)

(72) Inventor: Daniel John Imms, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 777 days.

(21) Appl. No.: 17/986,040

(22) Filed: Nov. 14, 2022

(65) Prior Publication Data

US 2024/0160436 A1 May 16, 2024

(51) Int. Cl.
*G06F 9/44* (2018.01)
*G06F 8/61* (2018.01)
*G06F 8/71* (2018.01)

(52) U.S. Cl.
CPC . *G06F 8/71* (2013.01); *G06F 8/61* (2013.01)

(58) Field of Classification Search
CPC .......... G06F 8/71
USPC .......... 717/120
See application file for complete search history.

(56) References Cited

U.S. PATENT DOCUMENTS 10,417,331 B2 * 9/2019 Singh .......... G06F 9/453
11,029,802 B2 * 6/2021 Zhao .......... G06F 3/0489
11,188,362 B2 * 11/2021 Bregman .......... G06F 8/60
11,216,293 B2 * 1/2022 Andrews .......... G06F 9/45508
11,907,700 B2 * 2/2024 Du .......... G06F 8/71
2008/0209316 A1 * 8/2008 Zandstra .......... G06F 8/00 715/700
2008/0295114 A1 * 11/2008 Argade .......... G06F 11/3698 719/320
2015/0019199 A1 * 1/2015 Andrews .......... G06F 9/45508 703/26
2019/0265843 A1 * 8/2019 Zhao .......... G06F 9/451
2020/0082792 A1 3/2020 Imms (Continued)

OTHER PUBLICATIONS

Michael Wanyoike, James Hibbard, "Installing Multiple Versions of Node.js Using nvm", retrieved from << https://www.sitepoint.com/quick-tip-multiple-versions-node-nvm/#:~:text=nvm%20stands%20for%20Node%20Version,between%20them%20and%20much%20more. >>, Jan. 23, 2018, 16 pages.

(Continued)

*Primary Examiner* — Evral E Bodden
(74) *Attorney, Agent, or Firm* — Wade IP Law PLLC

(57) ABSTRACT

A system command line interface (CLI) is enhanced by software development tool autoloading functionality. A textual command is routed to a development tool autoloader, which maps the command to a development tool and ascertains whether a conformant version of the tool is installed. If no version is installed, or only a nonconformant version is installed, then the autoloader locates a conformant version and installs it. Then the textual command is forwarded to the installed conformant version for processing. The textual command entered in the CLI is intercepted and routed to the autoloader by a shell alias, or a search path such as an environment variable, or both. Development tool installation conformance is determined using a predefined tool configuration specification. New developers are accordingly freed from research burdens, security risks, and delays otherwise imposed by the lack of a conformant tool version on their systems.

20 Claims, 3 Drawing Sheets

EXAMPLE DEVELOPMENT TOOL AUTOLOADING METHOD 400

(56) References Cited

U.S. PATENT DOCUMENTS

| | | | | |
|---|---|---|---|---|
| 2021/0089138 | A1 | 3/2021 | Imms | |
| 2022/0156048 | A1* | 5/2022 | Fox | G06F 9/45512 |
| 2024/0069940 | A1* | 2/2024 | Imms | G06F 13/107 |

OTHER PUBLICATIONS

"Nvm-sh/nvm", retrieved from << https://github.com/nvm-sh/nvm >>, Sep. 21, 2022, 28 pages.

Paul Krill, "Microsoft .NET 7 bolsters WebAssembly support", retrieved from << https://www.infoworld.com/article/3674862/microsoft-net-7-bolsters-webassembly-support.html >>, Sep. 28, 2022, 2 pages.

Richard Devine, "How to use Visual Studio Code in a web browser", retrieved from << https://www.windowscentral.com/how-use-visual-studio-code-web-browser >>, Nov. 9, 2021, 11 pages.

Theo Despoudis, "How To Build A Runtime Environment From Source", retrieved from << https://www.activestate.com/blog/how-to-build-a-runtime environment-from-source/ >>, Mar. 18, 2021, 14 pages.

"Compile Python to WebAssembly (WASM)", retrieved from << https://pythondev.readthedocs.io/wasm.html >>, no later than Apr. 30, 2022, 4 pages.

"Environment variable", retrieved from << https://en.wikipedia.org/wiki/Environment_variable >>, Aug. 4, 2022, 14 pages.

"Computer terminal", retrieved from << https://en.wikipedia.org/wiki/Computer_terminal >>, Oct. 5, 2022, 14 pages.

"Terminal emulator", retrieved from << https://en.wikipedia.org/wiki/Terminal_emulator >>, Jul. 20, 2022, 7 pages.

"Operating system", retrieved from << https://en.wikipedia.org/wiki/Operating_system >>, Oct. 12, 2022, 29 pages.

"Windows Subsystem for Linux", retrieved from << https://en.wikipedia.org/wiki/Windows_Subsystem_for_Linux >>, Oct. 18, 2022, 9 pages.

Ubuntucat, "Software installation in Linux is difficult", retrieved from << https://www.psychocats.net/ubuntucat/software-installation-in-linux-is-difficult/ >>, May 18, 2009, 38 pages.

"Installation (computer programs)", retrieved from << https://en.wikipedia.org/wiki/Installation_(computer_programs) >>, Oct. 4, 2022, 7 pages.

"Toolchain", retrieved from << https://en.wikipedia.org/wiki/Toolchain >>, Oct. 11, 2022, 2 pages.

"Node.js", retrieved from << https://en.wikipedia.org/wiki/Node.js >>, Oct. 18, 2022, 12 pages.

"Bionic (1) kdesvn.1.gz", retrieved from << https://manpages.ubuntu.com/manpages/bionic/man1/kdesvn.1.html >>, no later than Dec. 31, 2019, 3 pages.

Ubuntucat, "Know why software installation is difficult on Linux? It's a secret. I can't tell you.", retrieved from << https://www.psychocats.net/ubuntucat/know-why-software-installation-is-difficult-on-linux-its-a-secret-i-cant-tell-you/ >>, May 18, 2009, 11 pages.

"What is a tty, and how do I access a tty?", retrieved from << https://askubuntu.com/questions/66195/what-is-a-tty-and-how-do-i-access-a-tty >>, Oct. 14, 2011, 5 pages.

"Shell (computing)", retrieved from << https://en.wikipedia.org/wiki/Shell_(computing) >>, Sep. 23, 2022, 6 pages.

"Unix shell", retrieved from << https://en.wikipedia.org/wiki/Unix_shell >>, Oct. 14, 2022, 6 pages.

"Node.js debugging in VS Code", retrieved from << https://code.visualstudio.com/docs/nodejs/nodejs-debugging >>, Oct. 6, 2022, 14 pages.

"What is Auto Loader?", retrieved from << https://learn.microsoft.com/en-us/azure/databricks/ingestion/auto-loader/ >>, Oct. 12, 2022, 3 pages.

"Runtime system", retrieved from << https://en.wikipedia.org/wiki/Runtime_system >>, Jun. 15, 2022, 7 pages.

"3. Configure Python", retrieved from << https://docs.python.org/3/using/configure.html >>, no later than Nov. 1, 2022, 14 pages.

"Terminal Advanced", retrieved from << https://code.visualstudio.com/docs/terminal/advanced >>, Oct. 6, 2022, 8 pages.

"Python Debugger—Python pdb", retrieved from << https://www.geeksforgeeks.org/python-debugger-python-pdb/ >>, Sep. 30, 2022, 11 pages.

"Gitpod: FAQs", retrieved from << https://www.gitpod.io/docs/references/ides-and-editors/faqs >>, no later than Oct. 30, 2022, 4 pages.

"JetBrains Fleet", retrieved from << https://www.jetbrains.com/fleet/ >>, no later than Nov. 3, 2022, 11 pages.

"Xcode 14", retrieved from << https://developer.apple.com/xcode/ >>, no later than Nov. 3, 2022, 7 pages.

"Text Editing, Done Right", retrieved from << https://www.sublimetext.com/>>, no later than Nov. 3, 2022, 2 pages.

* cited by examiner

EXAMPLE DEVELOPMENT TOOL AUTOLOADING METHOD 400

ADDITIONAL ASPECTS OF SOME
DEVELOPMENT TOOL AUTOLOADING METHODS 500

SOFTWARE DEVELOPMENT TOOL INSTALLATION AND COMMAND ROUTING

BACKGROUND

Many modern devices in a broad range of fields have some form of computing power, and operate according to software instructions that execute using that computing power. A few of the many examples of devices whose behavior depends on software include cars, planes, ships and other vehicles, robotic manufacturing tools and other industrial systems, medical devices, cameras, inventory management and other retail or wholesale systems, smartphones, tablets, servers, workstations and other devices which connect to the Internet.

The firmware, operating systems, applications and other software programs which guide various behaviors of these and many other computing devices is developed by people who may be known as developers, programmers, engineers, or coders, for example, but are referred to collectively here as "developers". Developers interact with source code editors, compilers, debuggers, profilers and various other software development tools as they develop software.

Although many advances have been made, improvements in software development technologies remain possible, and are worth pursuing.

SUMMARY

Some embodiments described herein address technical challenges related to software development that utilizes a command line interface environment of a computing system. Sometimes during a software development effort, a command line interface receives a textual command that attempts to invoke a software tool which is not installed on the computing system. This poses the technical challenge of installing the tool in order to carry out the command, which in turn poses the challenges of locating and selecting a suitable version of the tool, sometimes from among a multiplicity of programs which nominally correspond to the command that attempted to invoke the tool. Another challenge facing the system is how to respond to the command with minimal disruption to the software development effort.

Upon getting a textual command in a command line interface, some embodiments described herein intercept the command and route the command to a development tool autoloader. The autoloader maps the textual command to a software development tool. When the autoloader ascertains that the tool is not installed in conformance with a predefined tool configuration specification, the autoloader locates and installs a conformant version of the tool. Finally, the textual command is forwarded to the installed tool for handling. The command interception, tool autoloading, and command forwarding collectively and effectively address the challenges noted above.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
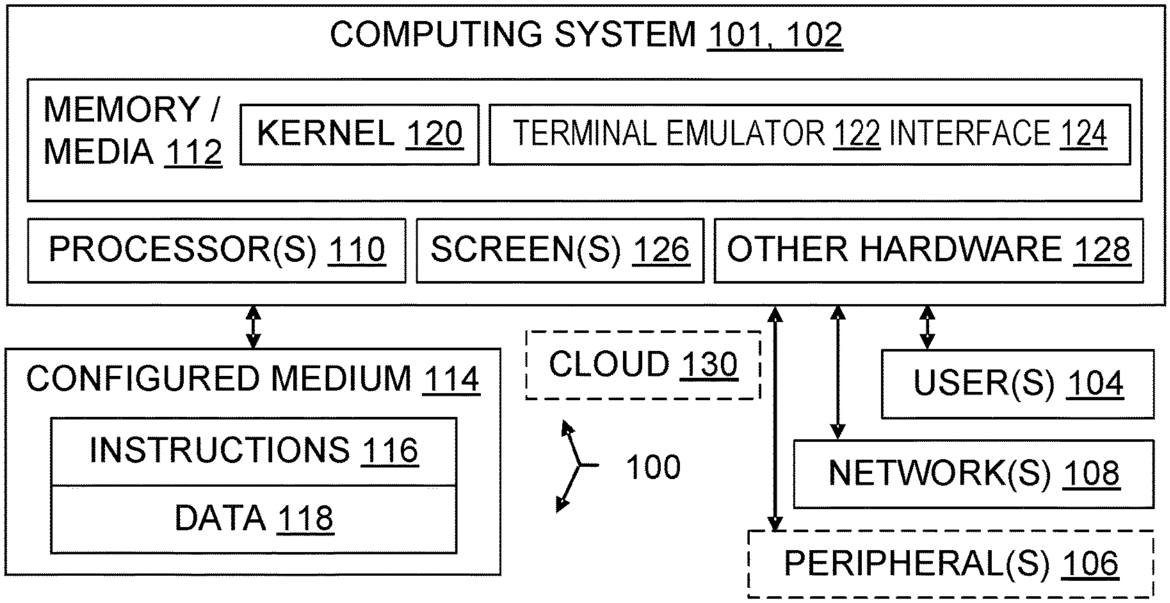
FIG. 1 is a diagram illustrating aspects of computer systems and also illustrating configured storage media, including some aspects and items which are generally suitable for systems enhanced for development tool autoloading.

Innovations may expand beyond their origins, but understanding an innovation's origins can help one more fully appreciate the innovation. In the present case, some teachings described herein were motivated by technical challenges arising from ongoing efforts by Microsoft to help software developers. In particular, technical challenges arose during efforts to provide an overarching software development tool known as an integrated development environment (IDE) which would run commands in a browser without any back-end support.

One aspect of the IDE is the IDE's CLI. Industry terminology around CLIs varies. Depending on the definition used, "CLI" stands for "command line interpreter", "command language interpreter", or "command line interface". In some cases, a command line interface per se, or a command launching program that is connected to the interface, or both, is also denoted a "terminal emulator" (sometimes called a "terminal"), a "console", a "shell", or a CLI, depending on the terminology in use.

Regardless, for present purposes the term "CLI environment" refers to a computing environment which includes any variation of a CLI (command line interpreter, command language interpreter, or command line interface, treated herein as equivalents indicating their broadest collective meaning). All CLI environments accept textual input specifying a command for execution by a computing system, and they all report at least some execution results as textual output to a screen. The textual input is typically entered via a keyboard (which is physical or virtual or both), and is usually echoed to the screen. A CLI may run inside a window in a graphical user interface (GUI), but CLIs preceded GUIs in the development of computing systems, and CLIs do not require a GUI in order to run. Indeed, CLIs are used on some computing systems that have no GUI installed, including in particular computing systems that physically lack a mouse, pen, touchpad, touch screen, or other input peripheral commonly used with a GUI. In a minimal CLI system, input is via a keyboard and output is via a screen.

In CLI environments, commands tend to have short and hence obscure names, in order to reduce the amount of typing required to enter a command. In some systems, for instance "mkdir" is a command to make a directory, "pwd" is a command to print the filesystem path that ends at the current working directory, and "ps" is a command to display process status information.

Many commands have arguments (sometimes called "parameters"), and it is not unusual for CLI environment commands to have a complex syntax for specifying their arguments. Accordingly, many CLI environments provide a manual page service, e.g., in Linux® systems and some others, the command "man" followed on the same line by a command name as an argument prints a manual page that displays syntax guidance and examples for the command that was named as the argument (mark of Linus Torvalds). Man documentation availability for a command depends on the particular command and the particular CLI environment. As an example, in some CLI environments execution of the command "man man" displays the manual page for the man command, which begins something like the following as shown, e.g., on a web page at man7 dot org slash linux slash man-pages slash man1 slash man dot 1 dot html: NAME man—an interface to the system reference manuals Synopsis man [man options] [[section] page . . . ] . . .
man -k [apropos options] regexp . . .
man -K [man options] [section] term . . .
man -f [whatis options] page . . .
man -I [man options] file . . .
man -w|-W [man options] page . . .

DESCRIPTION man is the system's manual pager. Each page argument given to man is normally the name of a program, utility or function. The manual page associated with each of these arguments is then found and displayed . . .

The functionality of the man command is relatively straightforward, namely, to display manual page contents. But the functionality of many other CLI environment commands is more complex, and more implementation-dependent.

As a motivating example, consider the "python" command. The Python® programming language is often used in CLI environments. (Python® is a mark of the Python Software Foundation.) For consistency the present disclosure follows industry practice by referring to a tool which operates as a Python® language interpreter as "python". Such a python tool may also include a runtime. More than one implementation of the "python" command exists, and some of the implementations vary significantly from one another. Some implementations are associated with a particular operating system distribution, some are "portable" in the sense that they can be installed without elevated privileges (e.g., by copying files onto a flash drive), and some are designed to run inside a web browser without requiring access to a back-end server.

Moreover, numerous options exist for configuring a python installation. For example, as of 1 Nov. 2022, Chapter 3 "Configure Python" in version 3.11.0 of the documentation at docs dot python dot org slash 3 slash using slash configure dot html includes three sections. Section 3.1 "Configure Options" lists fourteen General Options, three WebAssembly Options, two Install Options, six Performance options together with one environment variable PROFILE_TASK, a Python Debug Build configuration option, eight Debug options, two Linker options, ten Libraries options, three Security options, six macOS Options, and three Cross Compiling Options together with one environment variable CONFIG_SITE. Section 3.2 "Python Build System" and Section 3.3 "Compiler and linker flags" contain additional options and environment variable information.

It may be asserted that default options can always be used, so the job of configuring a python installation is not as complex as it appears. But if default options were always the best, then there would have been no reason to provide the ability—which is shown in Chapter 3 and similar documentation for other programming tools—to override the default options in a particular installation.

The selection of suitable options poses a particularly difficult challenge to a software developer who is new to development generally, or one who is experienced in other aspects of software development but new to development in a particular CLI environment. For convenience, each of these is referred to herein as a "new developer". As evident in the Chapter 3 "Configure Python" example, the amount of documentation to search for configuration guidance is often vast. In some situations, the new developer can ask a community of more experienced developers for help navigating the documentation, or help that reduces the need for such navigation. But help is not always forthcoming. Some new developers encounter attitudes they have characterized as arrogant, which discourage them from asking further questions "after the first verbal flogging."

Moreover, a new developer who is told to run unfamiliar commands to configure an environment faces a security risk. Some commands will install malware. Some repositories vet their contents (formally or informally) for malware more effectively than other repositories. Without guidance to separate obscurely named unsafe commands from obscurely named safe ones, and guidance to separate obscurely named required or at least helpful commands from obscurely named unnecessary commands, the new developer's own actions pose significant security risks.

The security risk is compounded by the difficulty of locating safe and suitable copies of some command programs. In theory, a safe command implementation can be obtained by vetting the source code and then building the executable command program from the source code. But in practice, vetting thousands of lines of source code is impractical, particularly for developers who are unfamiliar with malware implementation, or have other pressing work, or both.

Moreover, compiling source code to create executable command programs is notoriously difficult in many CLI environments. All too often, an attempt to compile a command program from source code starts with the significant challenge of finding a reliable and suitable version of the source code, is followed by side trips to determine system requirements, obtain build tools, and locate decompression tools that match the tar or other archive format of the compressed source code, and then turns into a nightmare of tracking down and resolving build dependencies and deciphering compiler or linker errors.

Accordingly, when a CLI gets a command to execute a tool that is not installed, a quit-on-error approach does little or nothing more than displaying an error message to indicate the tool was not found. For example, if a developer types a command "python foobar.py" into a CLI on a given non-enhanced system and python is not installed on that system, then that system displays an error message such as "'python' is not recognized as an internal or external command, operable program or batch file."

However, this quit-on-error approach interrupts the development workflow containing the command, potentially for hours or days while the developer searches for a copy of the command program to install, or builds one, or both. The quit-on-error approach also dumps a new developer into the pile of challenges noted above, such as how to locate a safe copy of a python command program, and how to install and possibly otherwise configure that python command program on the current system, despite the lack of community guidance for new developers.

Some embodiments taught herein provide an alternative to the quit-on-error approach, which involves an autoloading approach. Upon getting a textual command in a CLI, these autoloading embodiments route the textual command to a development tool autoloader. The development tool autoloader maps the textual command to a software development tool (e.g., a python interpreter), ascertains that the software development tool is not installed on the computing system in conformance with a predefined software development tool configuration specification, locates a conformant version of the software development tool, installs the conformant version on the computing system, and forwards the textual command to the installed software development tool. In this manner, the computing system is enhanced by tool autoloading functionality taught herein.

A benefit provided by these tool autoloading embodiments is that new developers are not compelled to locate a safe copy of a command program, or to figure out how to install and possibly otherwise configure that command program, when community guidance is effectively unavailable to them.

Another benefit of some of these tool autoloading embodiments is that the development workflow containing the command is not interrupted for more than a short time. The command program can be located and installed relatively quickly, and then the command is forwarded to the installed command program and executed.

Another benefit of some of these tool autoloading embodiments is that the embodiment proactively automatically provides a debugger in the CLI environment. This includes launching the installed software development tool as a process, and also launching a debugger which provides debug access to the process. The debugger communicates with the command line interface.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 130. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface by using displays 126, keyboards 106, and other peripherals 106, via typed text, touch, voice, movement, computer vision, gestures, and/or other forms of input/output (I/O). Virtual reality or augmented reality or both functionalities are provided by a system 102 in some embodiments. A screen 126 is a removable peripheral 106 in some embodiments and is an integral part of the system 102 in some embodiments. A user interface supports interaction between an embodiment and one or more human users. In some embodiments, the user interface includes one or more of: a command line interface 124, a graphical user interface (GUI), natural user interface (NUI), voice command interface, or other user interface (UI) presentations, presented as distinct options or integrated. In particular, a command line interface 124 may receive input via a keyboard, or by voice command such as speech-to-text translation or other voice input, or both.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 130 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 204 include security tools or software apps, on mobile devices 102 or workstations 102 or servers 102, as well as APIs, browsers, or webpages and the corresponding software for protocols such as HTTPS, for example. Files, application program interfaces (APIs), endpoints, and other resources may be accessed by an account or set of accounts, user 104 or group of users 104, Internet protocol (IP) address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, compact disc (CD), digital versatile disk (DVD), memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in random access memory (RAM), read only memory (ROM), hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., central processing units (CPUs), arithmetic and logic units (ALUs), floating point processing units (FPUs), tensor processing units (TPUs), graphical processing units (GPUs), and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, tool autoloading functionality 206 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

In any later application that claims priority to the current application, reference numerals may be added to designate items disclosed in the current application. Such items may include, e.g., software, hardware, steps, methods, systems, functionalities, mechanisms, data structures, resources, entities, or other items in a computing environment, which are disclosed herein but not associated with a particular reference numeral herein. Corresponding drawings may also be added.

More About Systems

Figure 2:
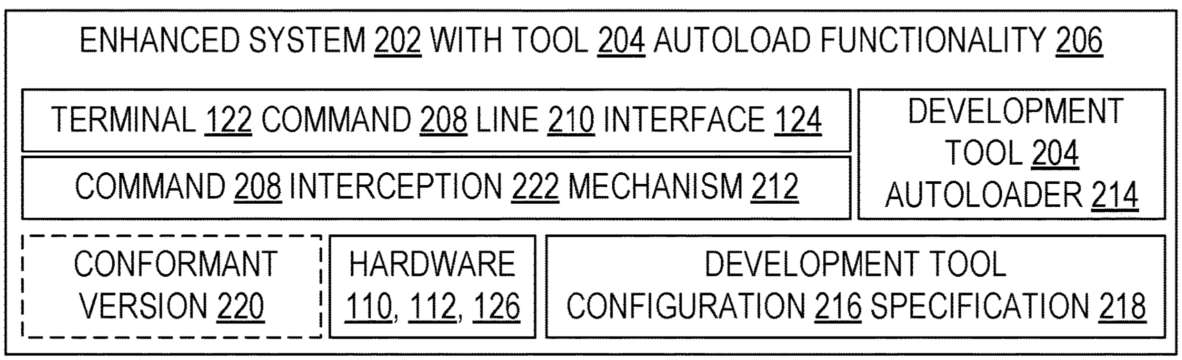
FIG. 2 is a diagram illustrating an enhanced system configured with development tool autoloading functionality.

FIG. 2 illustrates a computing system 102 configured by one or more of the development tool autoloading enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
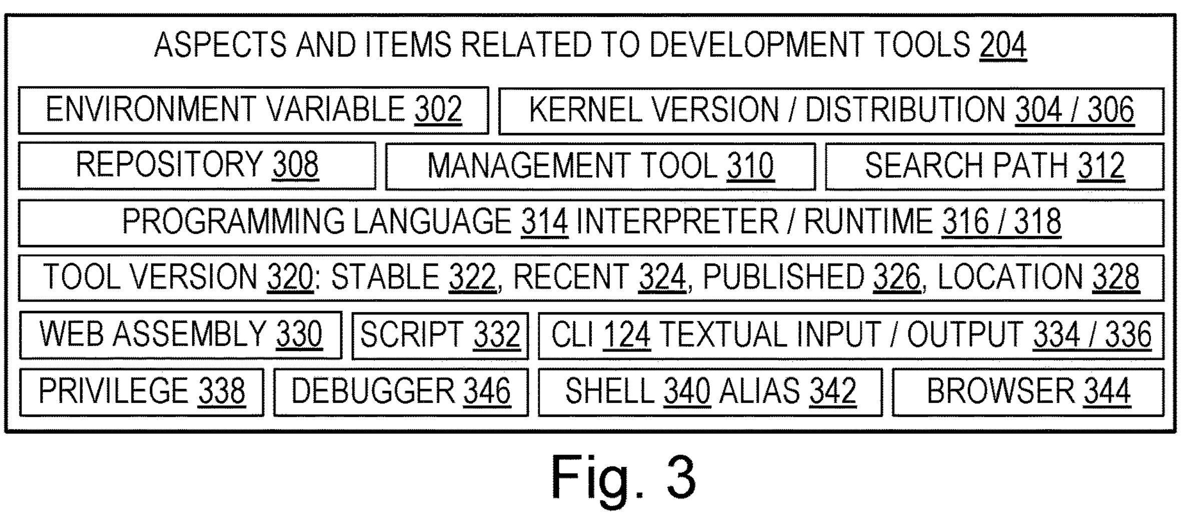
FIG. 3 is a block diagram illustrating some aspects and examples of development tool selection, installation, configuration, operation, and related items.

FIG. 3 shows some aspects and examples of development tools 204 and related items. This is not a comprehensive summary of all aspects of software development or all aspects of development tool autoloading functionality 206 involving one or more machines 101. Nor is it a comprehensive summary of all aspects of an environment 100 or system 202 or other context of a software development effort, or a comprehensive summary of all software development mechanisms or autoloading mechanisms for potential use in or with a system 102. FIG. 3 items are discussed at various points herein, and additional details regarding them are provided in the discussion of a List of Reference Numerals later in this disclosure document.

In some embodiments, the enhanced system 202 is networked through a networking interface. In some, a networking interface includes hardware such as network interface cards, software such as network stacks, APIs, or sockets, combination items such as network connections, or a combination thereof.

In some situations where a CLI software development tool 204 is not present on a system 202, the system automatically installs the tool in response to a command 208 invoking the tool, and then sends the command to the tool for execution. For example, when a command line 210 includes the command 208 "python foobar.py" and no Python® tool implementing a Python® interpreter 316 is present, some embodiments automatically install a python program 204, 316 and then send the command 208 to that python program for execution. This functionality does not necessarily prevent an embodiment from doing other things, such as inquiring first whether the developer wants the missing tool to be installed. On the other hand, this functionality also does not require such an inquiry; some embodiments perform silent installs of missing tools 204.

In some embodiments, a software development computing system 202 includes: a terminal emulator 122 configured to receive 402 a textual command 208 in a command line interface 124; a command interception mechanism 212 configured to route 404 the textual command to a development tool autoloader 214; a digital memory 112; and a processor 110 in operable communication with the digital memory. The processor is configured to execute 426 the terminal emulator 122, the command interception mechanism 212, and the development tool autoloader 214. The development tool autoloader includes instructions 116 which upon execution 426 by the processor cause the development tool autoloader to automatically and proactively: map 406 the textual command 208 to a software development tool 204, ascertain 408 that the software development tool is not installed on the computing system 202 in conformance with a predefined software development tool configuration specification 218, locate 410 a conformant version 220 of the software development tool, install 412 the conformant version on the computing system 202, configure 216 the installed software development tool, and forward 414 the textual command to the installed 412 and configured 216 software development tool 204. In a variation, some embodiments omit the configuring 216 because installing 412 is itself sufficient.

In this context, "the software development tool is not installed on the computing system in conformance with a predefined software development tool configuration specification" means that either the tool is not installed at all, or that the tool is not installed in the way specified 218, e.g., the wrong version 320 of the tool is installed.

In this context, installing 412 a tool program is accomplished by copying the tool program into an accessible location 328 on a system 202 and ensuring that an identification of the location 328 is present in a search path 312, so that the tool program will be found when the tool is invoked in a command 208. In some embodiments, tool program installation 412 is sufficient by itself to ensure that control is passed to the tool program when the tool is invoked and that the tool program will then execute normally. However, in some other embodiments, some configuring 216 is required after installation in order for a tool to operate normally. For example, configuration 216 may set an environment variable 302 other than a search path 312, create a temporary file, override a default value that installation alone does not alter, verify a licensing status, or perform other operations that impact how the tool program will execute 426 after it receives the forwarded 414 command.

In some embodiments, the command interception mechanism 212 includes at least one of: a shell alias 342 which matches at least a portion of the textual command to the development tool autoloader, or an environment path variable 302 or another search path 312 definition which specifies a location 328 of the development tool autoloader.

A shell alias 342 is one example of a command interception mechanism 212. As an illustration of aliasing, consider the example alias 342 defined by the shell 340 command "alias python=code—runtime python". In this example, the first part "alias python" instructs a shell such that when the shell receives a command "python" the shell will look for whatever is after the "=" in the alias. The last part "alias python=code—runtime python" means that the shell will look for an executable program named "code" and launch that executable and pass that executable the string "python" as the value of the argument named "runtime". The shell 340 will also pass along any other arguments as well; for example, "python foo" will be mapped to "code—runtime python foo". In the last part, "code" is a placeholder for the purpose of this explanation; it will be replaced in a given implementation by the name of whatever program goes and looks for actual python and installs actual python if necessary. In one implementation, "code" refers to an enhanced Visual Studio Code® CLI 124 that handles the intercepted call in that implementation (mark of Microsoft Corporation).

A search path 312 definition is another example of a command interception mechanism 212. In this regard, the development tool autoloader 214 is optimally placed at or near the front of the search path, to help ensure that the autoloader will be found—and thus receive command execution control—instead of any other program that happens to have the tool's name. Depending on the embodiment, the autoloader may be named "python", or have a different name. In some embodiments the name of the autoloader is not the same as the tool name, but the embodiment sends all commands through the autoloader anyway. For example, some embodiments have a preprocessing functionality which specifies the autoloader as a command preprocessor, and some embodiments have a pipe architecture which specifies the autoloader as a processing component to which commands are initially piped.

In some embodiments, sending commands to the development tool autoloader 214 allows the autoloader to check for conformance of a tool's configuration with the configuration specification 218 in different scenarios. In one scenario, no version of the tool is installed, and the autoloader treats the absence (i.e., lack of installation) of a tool as a nonconformant installation. In another scenario, an incorrect version of the tool is installed. For instance, suppose python version 2 is installed but the specification 218 calls for python version 3. If the command "python foo.py" is not intercepted 222 and routed 404 to the autoloader 214, then python version 2 will execute the command, or will at least attempt to execute the command. But if the autoloader gets the command instead of python version 2 getting the command, then python version 3 will be installed and configured by the autoloader, after which the command will be executed by python version 3, not by python version 2.

Some embodiment examples herein include a programming language runtime system 318, or a web assembly 330, or both. However, teachings herein may also be beneficially applied to other aspects of a programming languages 314 in addition to the runtime 318, and to other kinds of tools 204 that would be invoked in a CLI and are susceptible to automatic installation, e.g., compilers 204, syntax checkers 204, static analysis tools 204, repository access tools 204, and other CLI tools 204.

Some embodiments of an enhanced system 202 include the software development tool 202. In some, the software development tool includes at least one of: a programming language interpreter 316, a programming language runtime system 318 ("runtime" for short), or a web assembly 330.

Some embodiments specify 218 a value for at least part of a software development tool configuration 216. A given value may be chosen to serve as the specified configuration value under a choice hierarchy that favors a stated user preference, if available, over a most recent value, if available, which is favored in turn over a default value.

In some embodiments, the development tool autoloader 214 specifies 218 a value for one or more of the following when the autoloader installs and configures the development tool: a tool version 320 number, a Linux® distro (mark of Linus Torvalds), a search path 312 setting, or another environment variable 302 setting. Some editors 204 work with an opened folder, which some embodiments check for additional useful context for use in deriving an optimized tool version 320, such as a tool version limitation. For instance, some projects which are configured to be built using a tool X will only build as desired with certain versions of the tool X. This tool version limitation is noted in some circumstances in the opened folder of an editor or other development tool, and serve functionally as part of the configuration specification 218.

Some embodiments include a predefined software development tool configuration specification 218. In some, the predefined software development tool configuration specification specifies at least one of: a version 320 of the software development tool 204; a version 304 or a distribution 306 or particular distribution fragment of an operating system or another kernel 120; a repository 308 preference; an environment variable 302; or a search path 312 definition.

Other system embodiments are also described herein, either directly or derivable as system versions of described processes or configured media, duly informed by the extensive discussion herein of computing hardware.

Although specific development tool autoloading architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of development tool autoloading functionality 206, for example, as well as different technical features, aspects, security controls, mechanisms, rules, criteria, expressions, hierarchies, operational sequences, data structures, environment 100 or system 202 characteristics, or other functionality 206 teachings noted herein, and may otherwise depart from the particular illustrative examples provided.

Processes (a.k.a. Methods)

Figure 4:
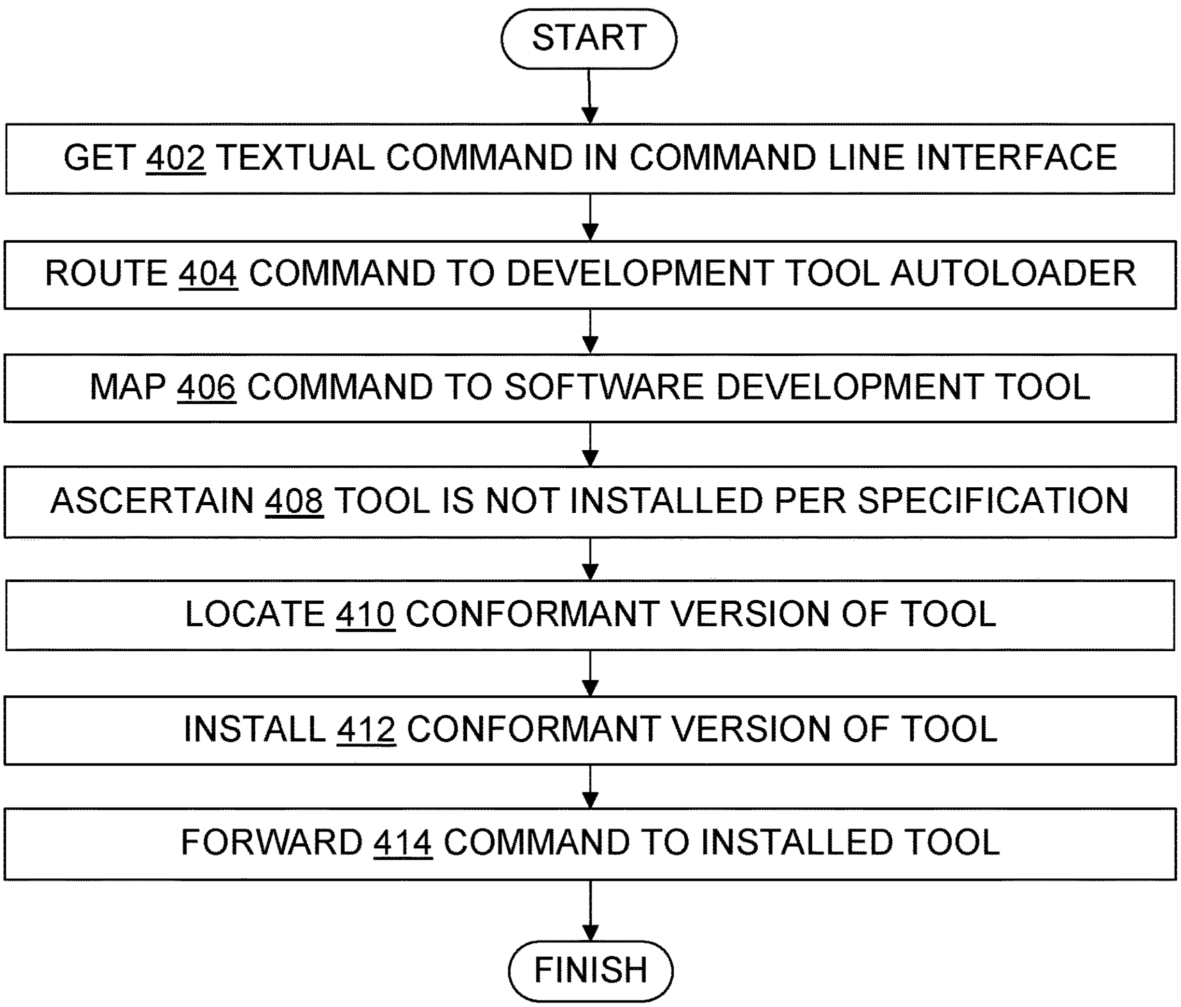
FIG. 4 is a flowchart illustrating steps in some development tool autoloading methods.
Figure 5:
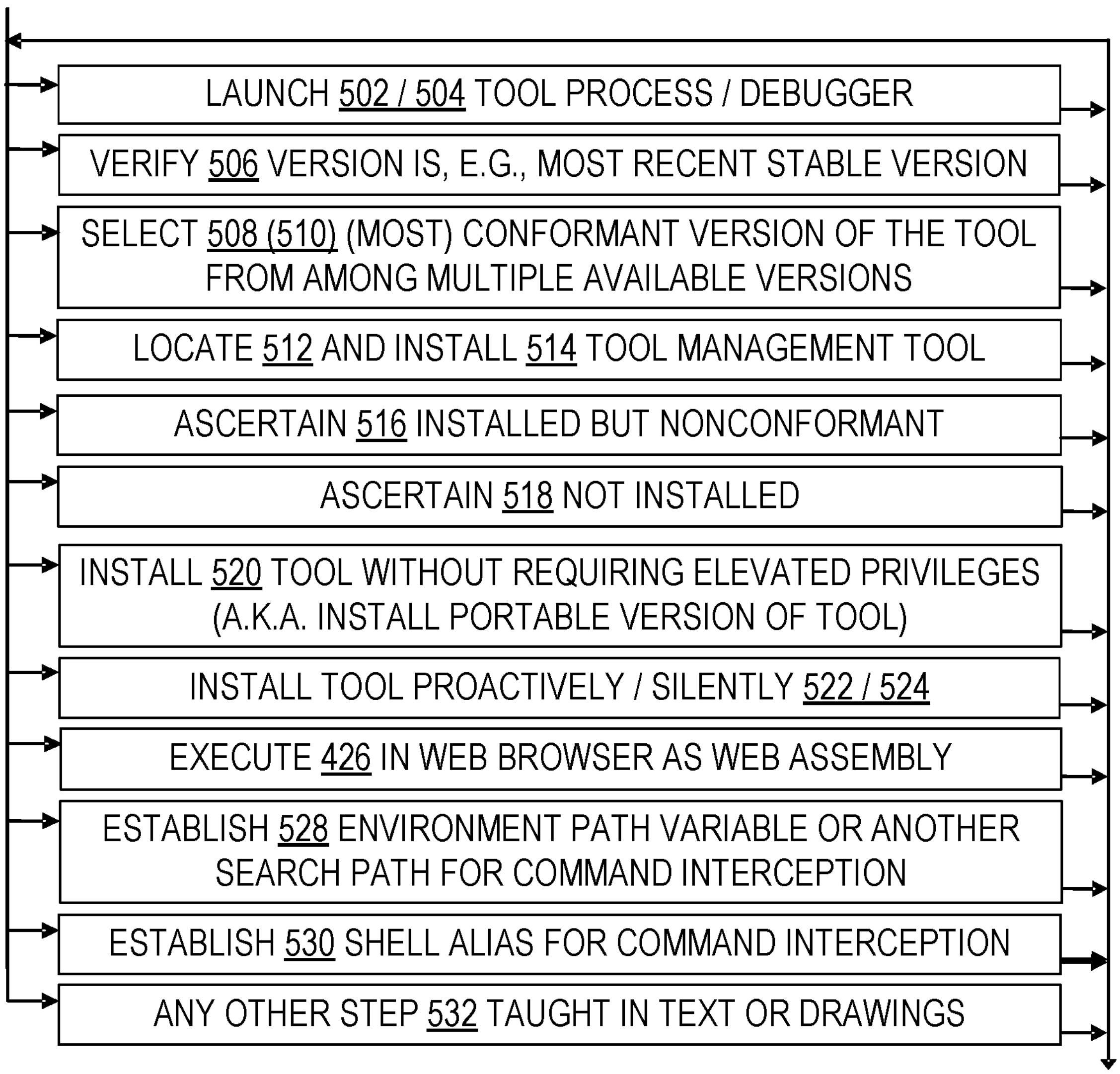
FIG. 5 is a flowchart further illustrating development tool autoloading methods, and incorporating FIG. 4.

Methods (which are also be referred to as "processes" in the legal sense of that word) are illustrated in various ways herein, both in text and in drawing figures. FIGS. 4 and 5 each illustrate a family of methods 400, 500 respectively, which are performed or assisted by some enhanced systems, such as some systems 202 or another functionality 206 enhanced system as taught herein. Method family 400 is a proper subset of method family 500. FIGS. 1 through 3 show development tool autoloading architectures with implicit or explicit actions, e.g., steps for reading data, writing data, or comparing data, or otherwise processing data 118, in which the data 118 include, e.g., environment variables 302, files, directories, search paths 312, peripheral I/O, and commands 208, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some embodiments a human 104 types in a value for the system 202 to use as a configuration specification file name. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 5. FIG. 5 is a supplement to the textual examples of embodiments provided herein and the textual descriptions of embodiments provided herein. In the event of any alleged inconsistency, lack of clarity, or excessive breadth due to an aspect or interpretation of FIG. 5, the text of this disclosure shall prevail over that aspect or interpretation of FIG. 5. Arrows in method or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 500 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 5 to be non-operable, the sequence S is not within the scope of any claim. Any assertion otherwise is contrary to the present disclosure.

Some embodiments provide or utilize a software development method, the method performed (executed) by a computing system 202, the method including: getting 402 a textual command 208 in a command line interface 124; routing 404 the textual command to a development tool autoloader 214; and the development tool autoloader: mapping 406 the textual command to a software development tool 204, ascertaining 408 that the software development tool is not installed on the computing system 202 in conformance with a predefined software development tool configuration specification 218, locating 410 a most conformant version 320, 220 of the software development tool, installing 412 the most conformant version on the computing system, and forwarding 414 the textual command to the installed software development tool. In a variation, the installed version is conformant but is not necessarily the most conformant version published, or even the most conformant version located.

Some embodiments optionally launch a debugger 346 that communicates with the CLI, e.g., to debug a script 332 running in a python runtime 318. In some embodiments, the method includes launching 502 the installed software development tool 204 as a process, and also launching 504 a debugger 346 which provides debug access to the process, and the debugger communicates with the command line interface 124. That is, the debugger interacts with a developer via the CLI inputs and outputs, e.g., via inputs from a keyboard and outputs to a screen.

In some embodiments, a benefit of the autoloading is that the most recent stable version of the CLI tool gets installed, which reduces security risk.

In some embodiments, locating 410 the conformant version of the software development tool includes verifying 506 that a located version is a most recent 324 stable 322 published 326 version 320 of the software development tool 204. In some variations, verification is limited to verifying recency but not stability, or verifying stability but not recency, or is limited to major versions (e.g., version 3.0 not 3.1). In some variations, the most recent version is not specified 218 due to incompatibility—some tools break across versions such that an item works with an earlier version but not with a later version. This is contrary to a naïve new developer view that the most recent version is always the best version.

In some variations, publication of the tool is nota criterion, in the sense that the tool is located in a non-public location such as a private repository or private archive.

In some embodiments, verification 506 includes checking a tool manifest or other tool description, and comparing values found there with values scraped from tool documentation. Official documentation websites, project websites, and third-party websites such as wiki websites contain tool development history data, including in many cases statements as to publication dates or version stability or both.

In some embodiments, a benefit of the autoloading is that an optimal version of the CLI tool gets installed when there are several to choose from. In this context, the "optimal" version is the one that is closest to a specified version, specified kind (e.g., regular, portable, or wasm), specified kernel distro 306, specified preferred repository 398, or one or more other specified selection criteria. In some embodiments, versions and their characteristics are tracked in a table or other data structure, and in some the characteristics are determined dynamically from manifests or documentation parsing, or both. In some, a version management tool such as the nvm Node version manager tool, or a source code version control tool, is accessed to obtain version characteristics data.

In some embodiments, locating 410 the conformant version of the software development tool includes selecting 510, from multiple available versions of the software development tool, a version which is most conformant with the predefined software development tool configuration specification. In a variation, locating 410 includes selecting 508 a conformant version without necessarily selecting 510 a most conformant version (i.e., one that meets at least as many of the selection criteria as any other available version).

In some embodiments, a benefit of the autoloading is that a management tool (e.g., nvm) will also be installed when there is one available. Some embodiments include locating 512 and installing 514 a management tool 310, 204 to manage the software development tool 204 which is invoked in the intercepted command 208. One or more of: repositories 308, search engine results (global or on an official or other documentation website), application stores, and built-in tables of location data for frequently invoked development tools are utilized for the locating (512 or 410 or both) in some embodiments.

In some embodiments, different possibilities are implicated when a check for the tool comes up empty. One possibility is that the tool is not installed at all, and another possibility is that the tool is not installed in the desired way, e.g., the wrong version is installed. Each possibility may be ascertained using, e.g., a scan of search paths 312 for the tool, a search in the present working directory if it is not already searched as a search path entry, or a utility such as the Linux® "which" command (mark of Linus Torvalds).

In some embodiments, ascertaining 408 that the software development tool is not installed on the computing system in conformance with a predefined software development tool configuration specification includes at least one of: ascertaining that the computing system includes an installed configuration of the software development tool which is not in conformance with the predefined software development tool configuration specification; or ascertaining that the computing system does not include any installed configuration of the software development tool.

In some embodiments, the development tool autoloader does not receive any further textual input via the command line interface while performing the mapping, ascertaining, locating, and installing. In particular, the autoloader in these situations does not prompt a developer for input, e.g., by displaying an inquiry such as "install python? yin".

In some embodiments, the development tool autoloader does not send any textual output to the command line interface while performing the mapping, ascertaining, locating, and installing. In particular, an autoloader in some of these situations does not send installation progress updates to stdout, but instead sends them to a non-displayed stream. If python is not installed, the next output displayed after the "python foo.py" command comes from the python interpreter and runtime after it is installed and begins executing the foo.py script. Output that marks milestones during the locating 410 and installing 412 is not shown on the screen. That is, the install in these situations is a silent install.

In some embodiments, the development tool 204 includes a web assembly 330, and after the installing 412 the web assembly executes 426 in a browser 344. For example, a wasm (web assembly) version of a Python® tool may be proactively automatically installed 412, for execution in a browser.

In some embodiments, locating 410 the conformant version of the software development tool includes selecting 508 the conformant version from at least three versions of the software development tool, each of which differs from the other two in at least one of the following ways: a distribution 306 of an operating system or another kernel, the distribution including a version of the software development tool; or a source repository 308, the source repository including a version of the software development tool.

In some embodiments, locating 410 the conformant version of the software development tool includes identifying and selecting 508 from a group which includes at least the following: a version of the software development tool that does not require elevated privileges 338 during installation 520, 412 (sometimes called a "portable" version), and a different version of the software development tool that includes a web assembly 330.

Configured Storage Media

Some embodiments include a configured computer-readable storage medium 112. Some examples of storage medium 112 include disks (magnetic, optical, or otherwise), RAM, electrically erasable programmable read-only memories (EEPROMs) or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as terminal emulators 122, development tool autoloaders 214, development tool configuration specifications 218, and command interception mechanisms 212, in the form of data 118 and instructions 116, read from a removable storage medium 114 and/or another source such as a network connection, to form a configured storage medium. The configured storage medium 112 is capable of causing a computer system 202 to perform technical process steps for development tool autoloading, as disclosed herein. The Figures thus help illustrate configured storage media embodiments and process (a.k.a. method) embodiments, as well as system and process embodiments. In particular, any of the process steps illustrated in FIG. 4 or 5 or otherwise taught herein may be used to help configure a storage medium to form a configured storage medium embodiment.

Some embodiments use or provide a computer-readable storage device 112, 114 configured with data 118 and instructions 116 which upon execution by a processor 110 cause a computing system to perform a software development method, the method performed by a computing system 202 in a cloud computing environment 130, 100 or in another computing environment 100, or both. This method includes: getting 402 a textual command in a command line interface; proactively automatically mapping 406 the textual command to a software development tool; proactively automatically ascertaining 408 that the software development tool is not installed on the computing system in conformance with a predefined software development tool configuration specification; proactively automatically locating 410 a conformant version of the software development tool; automatically installing 412 the conformant version on the computing system; and proactively automatically forwarding 414 the textual command to the installed software development tool.

In some embodiments, proactively automatically mapping 406 the textual command to the software development tool is performed by a development tool autoloader 214, e.g., via a table, key-value pairs, or other data structure, and is preceded by proactively automatically establishing 530 a shell alias 342 which matches at least a portion of the textual command to the development tool autoloader.

In some embodiments, proactively automatically mapping 406 the textual command to the software development tool is performed by a development tool autoloader 214, e.g., via a table, key-value pairs, or other data structure, and is preceded by proactively automatically establishing 528 an environment path variable 302 or another search path definition 312 which specifies a location 328 of the development tool autoloader.

In some embodiments, getting 402 the textual command in a command line interface includes getting a command line request to run a script 332 which is written in a programming language 314, installing 412 the conformant version includes installing a runtime 318 for the programming language, and forwarding 414 the textual command includes forwarding an argument from the command line request to the runtime for execution.

In some embodiments, the development tool autoloading method is performed in an enhanced terminal emulator 122, e.g., one that includes an autoloader 214.

Additional Observations

Additional support for the discussion of development tool autoloading functionality 206 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, examples and observations are offered herein.

Some embodiments utilize or provide automatic installation of development tools via additional integrated development environment (IDE) path contributions. Development tools such as Python® interpreters are often difficult to install and manage, even for an experienced user who has no particular time constraints. For a new developer 104, especially one facing time constraints, the complexity of tool installation is sometimes prohibitive. Instead of devoting hours (or in some cases, days) to a study of tool documentation, kernel documentation, kernel distribution documentation, and other aspects of tool installation in the uncertain hope of learning enough to install and configure a suitable version of the tool, the new developer 104 will either find a different tool, e.g., after switching to a different programming language 314, or else abandon the software development project that led the new developer to seek the tool.

Some embodiments taught herein handle such installation and version management in an IDE. Some inject a tool program (e.g., a python executable) into the IDE's terminal, which when called will either detect available python (or other tool) installations and select an appropriate one, or install a new version of python (or another tool) which is managed by the IDE and forward the execution request to it. This will make software development easier, especially when a developer uses multiple machines that have different initial configurations.

Moreover, in some situations the action performed by an embodiment is contrary to—and more secure or effective than—directions for manual action, e.g., when a community member gives a new developer 104 well-intentioned but incorrect or incomplete directions, based on the member's use of one tool or one distribution that does not apply to a different tool or different distribution. In some situations, an embodiment resolves an ambiguity or gap in directions for manual action. For example, some manual action directions state that a tool program can be downloaded from a repository but fail to state which directory the tool program is to be downloaded onto, e.g., /bin versus/usr/bin, or fail to state where the tool's configuration data should be located, e.g., in/etc versus/usr/local/etc.

Some embodiments route development tool CLI requests to an IDE web assembly runtime. Some IDEs have a web assembly compiled version of developer tools (e.g., language 314 interpreters 316 and runtimes 318) built into the IDE, e.g., in an extension host. This supports an IDE which executes in a browser without access to general purpose execution capability, e.g., without direct access to a system 102 processor 110 to execute binaries on.

Some embodiments intercept CLI requests made in the IDE's terminal, such as a python request. Interception may be accomplished, e.g., by adding a shell alias (such as "alias python-code—runtime python"), or by putting the web assembly tool in the IDE's bin directory, which is exposed on a PATH or by injection into the shell's environment. Then requesting "python file.py" would do roughly the following:

1. Launch the enhanced terminal if it's not already launched.
2. Ask the extension host for a WebAssembly (WASM) python runtime, which it will install if not already present.
3. Forward the "file.py" argument to the WASM python executable in the extension host and attach the input/output pipes such that the program runs in the enhanced terminal's version of python and its output displays in the enhanced terminal.

In a further example, a developer launches an IDE (e.g., an enhanced Visual Studio Code® IDE, mark of Microsoft Corporation). The user wants to run a Python® file (mark of Linus Torvalds). The user opens the terminal. The Python® interpreter/runtime is not yet installed. When the IDE launches a terminal, it modifies an environment variable such that commands the user types on the terminal are passed through an autoloader service 214. The service determines whether the machine has a suitable environment (e.g., python) to execute the command, and if it does not, it fetches the environment and installs it (silently or not). An advantage is that a user can type in commands without worrying whether the environment for running the command is installed. This makes the developer experience much better. This is especially good for education and beginners, but also provides efficiency benefits for experienced developers.

In one scenario, a developer opens a terminal and types a command. However, no shell 340 is found. The embodiment creates a shell and adds the autoloader 214 to a bin directory at the front of a search path. The embodiment searches for the command using the shell and the autoloader. The command is not found. The autoloader locates 410 and installs 412 a program to execute the command. In a variation, this program is embedded in the autoloader, so the locate 410 is internal to the autoloader and the install 412 was performed when the autoloader was installed. Then the command is executed by the command program.

Technical Character

The technical character of embodiments described herein will be apparent to one of ordinary skill in the art, and will also be apparent in several ways to a wide range of attentive readers. Some embodiments address technical activities such as setting an environment variable 302, creating a shell alias 342, specifying 218 a developer tool 204 configuration 216, installing 412 a command program 204 on a computing system 202, and forwarding 414 a command 208 to a command program 204, which are each an activity deeply rooted in computing technology. Some of the technical mechanisms discussed include, e.g., shells 340, environment variables 302, command interception mechanisms 212, and development tool autoloaders 214. Some of the technical effects discussed include, e.g., silent installation 412 of previously missing development tools 204, reduced or minimal interruption of software development workflow, and enhanced system 202 security relative to manual installation of a tool by a new developer 104. Thus, purely mental processes and activities limited to pen-and-paper are clearly excluded. Other advantages based on the technical characteristics of the teachings will also be apparent to one of skill from the description provided.

Different embodiments provide different technical benefits or other advantages in different circumstances, but one of skill informed by the teachings herein will acknowledge that particular technical advantages will likely follow from particular innovation features or feature combinations, as noted at various points herein.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to execute a command despite the initial absence of a command program implementing a part of the command, how to do so with minimal disruption to a software development effort, and how to install the command program despite a lack of community guidance for new developers. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, peripherals, software process flows, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
ID: identification or identity
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
URI: uniform resource identifier
WAN: wide area network Note Regarding Hyperlinks Portions of this disclosure contain uniform resource identifiers (URIs), hyperlinks, IP addresses, and/or other items which might be considered browser-executable codes. These items are included in the disclosure for their own sake to help describe some embodiments, rather than being included to reference the contents of the web sites or files that they identify. Applicants do not intend to have these URIs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01 (VII).

Some Additional Terminology

Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, basic input/output system (BIOS) or unified extensible firmware interface (UEFI) code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (laaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Development tool autoloading operations such as getting 402 a command in a CLI, routing 404 the command to an autoloader 214, installing 412 a conformant version of a tool 204, and many other operations discussed herein, are understood to be inherently digital. A human mind cannot interface directly with a CPU or other processor, or with RAM or other digital storage, to read and write the necessary data to perform the development tool autoloading steps 500 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as ascertaining, autoloading, building, comparing, compiling, displaying, emulating, establishing, executing, forwarding, getting, installing, intercepting, launching, linking, locating, mapping, receiving, routing, selecting, sending, setting, specifying, verifying (and ascertains, ascertained, autoloads, autoloaded, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

101 machine in a system 102, e.g., any device having at least a processor 110 and a memory 112 and also having a distinct identifier such as an IP address or a media access control (MAC) address; may be a physical machine or be a virtual machine implemented on physical hardware

102 computer system, also referred to as a "computational system" or "computing system", and when in a network may be referred to as a "node"

104 users, e.g., user of an enhanced system 202

106 peripheral device

108 network generally, including, e.g., local area networks (LANs), wide area networks (WANs), software-defined networks, clouds, and other wired or wireless networks

110 processor; includes hardware

112 computer-readable storage medium, e.g., RAM, hard disks

114 removable configured computer-readable storage medium

116 instructions executable with processor; may be on removable storage media or in other memory (volatile or nonvolatile or both)

118 digital data in a system 102; data structures, values, mappings, software, artifacts, histories, electronically stored information (ESI), and other examples are discussed herein

120 kernel(s), e.g., operating system(s), BIOS, UEFI, device drivers

122 terminal emulator software; sometimes referred to herein as "terminal" alone without "emulator" although under some usage outside the present disclosure "terminal" means only certain hardware (a keyboard and a screen); terminal emulators may also be referred to as "terminal applications" or "terminal programs"; a conventional terminal emulator's functionality is limited to service as an I/O peripheral, whereas enhanced terminal emulators may include autoload functionality 206

124 enhanced terminal emulator interface; also referred to as a "CLI"

126 display screens, also referred to as "displays"

128 computing hardware not otherwise associated with a reference number 106, 108, 110, 112, 114

130 cloud, also referred to as cloud environment or cloud computing environment

202 enhanced computing system, i.e., system 102 enhanced with development tool autoload functionality 206

204 software development tool, e.g., shell 340, built-in shell command 208, add-on shell command 208 which performs software development computational activity, kernel, version control system, diagnostic software, browser, source code editor, IDE, compiler, interpreter, linter, linker, runtime, profiler, debugger, testing tool, static analysis tool, build tool, or deployment tool; software development includes any activity which uses a software development tool, or creates, documents, modifies, builds, deploys, tests, profiles, monitors, or analyzes software, as represented in a system 102 (purely mental or paper-and-pencil activity, and spoken discussion between humans, are each excluded)

206 functionality for development tool autoloading as taught herein; e.g., software or specialized hardware which performs or is configured to perform steps 404 and 408 and 412, or steps 406 and 408 and 412, or steps 408 and 410 and 412, or steps 404 and 414, or any software or hardware which performs or is configured to perform a method 500 or a computational development tool autoloading activity first disclosed herein

208 command, e.g., text identifying a command program and optionally arguments, as entered in a shell or a tool interface; 208 also refers to the command program itself, depending on context

210 command line in a CLI, e.g., a line of text which includes a tool name and zero or more arguments to be passed to the tool when the tool runs

212 command interception mechanism, e.g., sell alias or search path setting as described herein; used in conjunction with routing 404 commands to autoloaders 214

214 software development tool autoloader; an implementation of autoloading functionality 206

216 development tool configuration; 216 refers to computational activity of creating or altering or verifying configuration values, and to the result of such activity, depending on context

218 development tool configuration specification, e.g., representation in a data structure of a canonical, preferred, or acceptable set of configuration values; used to guide installation 412 or configuration 216 or both

220 a version of a development tool which conforms with a development tool configuration specification 218, or an identification (e.g., version number or location or both) in a system 202 of such a version; 220 also refers to the state or quality of a tool installation's conformance with a specification 218

222 command interception, e.g., computational activity which prevents a command from proceeding directly to a destination

302 environment variable in a system 102

304 version of an operating system or other kernel 120, or an identification (e.g., version number or location or both) in a system 202 of such a version

306 distribution of an operating system or other kernel 120, or an identification (e.g., name or location or both)

in a system 202 of such a distribution; sometimes referred to in industry as a "distro"
308 software repository, or an identification (e.g., web address) in a system 202 of such a repository; repositories often include a source code version control tool
310 tool management tool, e.g., the node.js tool has a tool management tool named "nvm" (node version manager)
312 search path in a system 102; often but not always implemented using an environment variable (a search path may be hard-coded into a shell or a kernel); specifies a search order or locations to search for a command, or both
314 programming language, as represented in a system 102
316 programming language interpreter in a system 102
318 programming language runtime in a system 102, e.g., python runtime; "runtime" meaning software 318 that supports the execution of code written in a programming language is related to but not the same as "run-time" or "run time" meaning the time at which execution occurs, and is also related to but not the same as "run time" meaning the length of time an execution consumes
320 version of a tool 204, or an identification (e.g., version number or location or both) in a system 202 of such a version
322 stable: characteristic of a tool version indicating relative stability or lack thereof; software is denoted stable (or not) by the software's vendor or other entity responsible for releasing authorized versions of the software
324 recent: characteristic of a tool version indicating relative recency or lack thereof; software is recent for present purposes if it is either (a) less than one year old, or (b) less old than a predefined recency threshold in a given system 202, or both
326 published: characteristic of a tool version indicating whether the version has been made available for download or copying by the software's vendor or other entity responsible for releasing authorized versions of the software; publication may be made to the world at large, or to a more limited group such as developers within a particular company
328 location, e.g., in a file system or a network, or both; location 328 refers to a location as represented in a system 102, not a mental construct
330 web assembly, e.g., a portable binary-code format, or a corresponding text format, or both, for executable programs; in some cases also includes software interfaces for facilitating interactions between such programs and a host environment; digital or computational or both
332 script, e.g., source code text written in an interpreted programming language, or a list of commands, or a combination thereof, in a system 102
334 textual input to a program, in a system 102
336 textual output from a program, in a system 102
338 security privilege in a system 102, e.g., permission, authorization, or authentication
340 shell, e.g., a program that exposes a kernel's service to other software, in a system 102; in some systems 102, a shell presents a CLI 124
342 shell alias, e.g., a shortcut or alternate name for a command, in a system 102
344 web browser, in a system 102
346 debugger, in a system 102
400 flowchart; 400 also refers to development tool auto-loading methods that are illustrated by or consistent with the FIG. 4 flowchart
402 computationally get a command in a CLI, e.g., via an API
404 computationally route a command to a tool auto-loader, e.g., using a pipe, redirection, search path, or other computational mechanism
406 computationally map a command to a development tool, e.g., by parsing a name from arguments in the command and looking up the name in a table that matches names to tools
408 computationally ascertain that a tool is not installed at all, or that it is installed but not conformant to the specification 218, e.g., by searching for the tool using a search path or a utility such as "which", and by comparing tool settings and context to the specification 218 if some version of the tool is found
410 computationally locate a conformant version, e.g., by searching a predefined set of repositories, or searching a prespecified app store or other archive, and by comparing tool settings and context to the specification 218
412 computationally install a conformant version, e.g., by running a predefined installation script which downloads, decompresses, copies, and performs other installation steps, depending on context
414 computationally forward a command to an installed tool, e.g., by using a pipe, redirection, search path, or other computational mechanism
500 flowchart; 500 also refers to development tool auto-loading methods that are illustrated by or consistent with the FIG. 5 flowchart (which incorporates the FIG. 4 flowchart)
502 computationally launch a tool 204 process
504 computationally launch a debugger 346 process, e.g., attached to a tool process for debugging activity in or by the tool
506 computationally verify that a version 320 has a desired characteristic, e.g., stable, most stable, recent, most recent, published to a specified group, located within a specified set of locations
508 computationally select a conformant version 320, 220, e.g., by comparing characteristics of available version(s) to a specification 218
510 computationally select a most conformant version 320, 220 from among two or more conformant versions, e.g., by comparing characteristics of conformant versions to a specification 218 and to each other
512 computationally locate 410 a tool management tool 310
514 computationally install 412 a tool management tool 310
516 computationally ascertain 408 installed tool is non-conformant to a specification 218
518 computationally ascertain 408 tool is not installed
520 computationally install 412 a tool 204 without presenting, using, or otherwise relying on an elevated privilege 338
522 computationally proactively install 412 a tool 204, e.g., without displaying an inquiry as to whether to install the tool
524 computationally silently install 412 a tool 204, e.g., without displaying any installation progress update during the installation activity
526 computationally execute a program; also referred to as "running" the program

528 computationally establish a search path by creating the search path (e.g., environment variable) if it does not already exist and setting the search path's value

530 computationally establish an alias 342 by creating the alias if it does not already exist and setting the alias's value

532 any step or item discussed in the present disclosure that has not been assigned some other reference numeral; 532 may thus be shown expressly as a reference numeral for various steps or items or both, and may be added as a reference numeral (in the current disclosure or any subsequent patent application which claims priority to the current disclosure) for various steps or items or both without thereby adding new matter

CONCLUSION

In some embodiments, system command line interface (CLI) 124 is enhanced by software development tool autoloading functionality 206. A textual command 208 is routed to a development tool autoloader 214, which maps 406 the command to a development tool 204 and ascertains 408 whether a conformant version 320, 220 of the tool is installed on the system 202. If no version is installed, or only a nonconformant version is installed, then the autoloader 214 locates 410 a conformant version 320, 220 and installs 412 it. Then the textual command 208 is forwarded 414 to the installed conformant version 320, 220 of the tool 204 for processing. The textual command 208 entered 402 in the CLI 124 is intercepted 222 and routed 404 to the autoloader 214 by a shell 340 alias 342, or a search path 312 such as an environment variable 302, or both. Development tool 204 installation conformance 220 is determined using a predefined tool configuration specification 218. New developers are accordingly freed from research burdens, security risks, and delays otherwise imposed by the lack of a conformant tool version 220 on their systems 102.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system comprising:

a terminal emulator configured to receive a textual command in a command line interface;

a command interception mechanism configured to route the textual command to a development tool autoloader;

a digital memory; and a processor in operable communication with the digital memory, the processor configured to execute the terminal emulator, the command interception mechanism, and the development tool autoloader, the development tool autoloader including instructions which upon execution by the processor cause the development tool autoloader to automatically:

map the textual command to a software development tool;

ascertain that a conformant version of the software development tool that conforms with a predefined software development tool configuration specification is not installed on the computing system;

based on the conformant version of the software development tool not being installed on the computing system, locate the conformant version of the software development tool, install the conformant version on the computing system, and configure the conformant version that is installed on the computing system to provide a configured version of the software development tool; and forward the textual command to the configured version of the software development tool.

2. The computing system of claim 1, wherein the command interception mechanism includes at least one of:

a shell alias which matches at least a portion of the textual command to the development tool autoloader; or an environment path variable or another search path definition which specifies a location of the development tool autoloader.

3. The computing system of claim 1, further comprising the software development tool, wherein the software development tool includes at least one of:

a programming language interpreter;

a programming language runtime system; or a web assembly.

4. The computing system of claim 1, further comprising the predefined software development tool configuration specification, wherein the predefined software development tool configuration specification specifies at least one of:

a version of the software development tool;

a version or a distribution of an operating system or another kernel;

a repository preference;

an environment variable; or a search path definition.

5. A software development method performed by a computing system, the method comprising:

getting a textual command in a command line interface;

routing the textual command to a development tool autoloader; and using the development tool autoloader to perform the following operations:

mapping the textual command to a software development tool;

ascertaining that the software development tool is not installed on the computing system in conformance with a predefined software development tool configuration specification;

locating a conformant version of the software development tool;

installing the conformant version on the computing system; and forwarding the textual command to the installed software development tool;

wherein at least one of the following:

the development tool autoloader receives no further textual input via the command line interface while performing the mapping, ascertaining, locating, and installing;

the development tool autoloader sends no textual output to the command line interface while performing the mapping, ascertaining, locating, and installing; or locating the conformant version of the software development tool comprises identifying and selecting the conformant version of the software development tool from a group which includes at least the following: a first version of the software development tool that does not require elevated privileges during installation, and a second version of the software development tool that includes a web assembly.

6. The method of claim 5, further comprising launching the installed software development tool as a process, and launching a debugger which provides debug access to the process and which communicates with the command line interface.

7. The method of claim 5, wherein locating the conformant version of the software development tool comprises verifying that a located version of the software development tool is a most recent stable published version of the software development tool.

8. The method of claim 5, wherein locating the conformant version of the software development tool comprises selecting, from multiple available versions of the software development tool, a version which is most conformant with the predefined software development tool configuration specification.

9. The method of claim 5, further comprising locating and installing a management tool to manage the software development tool.

10. The method of claim 5, wherein ascertaining that the software development tool is not installed on the computing system in conformance with a predefined software development tool configuration specification comprises at least one of:

ascertaining that the computing system includes an installed configuration of the software development tool which is not in conformance with the predefined software development tool configuration specification; or ascertaining that the computing system does not include any installed configuration of the software development tool.

11. The method of claim 5, wherein the development tool autoloader receives no further textual input via the command line interface while performing the mapping, ascertaining, locating, and installing.

12. The method of claim 5, wherein the development tool autoloader sends no textual output to the command line interface while performing the mapping, ascertaining, locating, and installing.

13. The method of claim 5, wherein the development tool includes a web assembly that executes in a browser after the conformant version of the computing system is installed on the computing system.

14. The method of claim 5, wherein locating the conformant version of the software development tool comprises selecting the conformant version from at least three versions of the software development tool, each of which differs from the other two in at least one of the following ways:

a distribution of an operating system or another kernel, the distribution including a version of the software development tool; or a source repository, the source repository including a version of the software development tool.

15. The method of claim 5, wherein locating the conformant version of the software development tool comprises identifying and selecting the conformant version of the software development tool from the group which includes at least the following: the first version of the software development tool that does not require elevated privileges during installation, and the second version of the software development tool that includes the web assembly.

16. A computer-readable storage device configured with data and instructions which upon execution by a processor cause a computing system to perform operations, the operations comprising:

getting a textual command in a command line interface;

automatically mapping the textual command to a software development tool;

automatically ascertaining that a conformant version of the software development tool that conforms with a predefined software development tool configuration specification is not installed on the computing system;

based on the conformant version of the software development tool not being installed on the computing system, automatically locating the conformant version of the software development tool and automatically installing the conformant version on the computing system to provide an installed version of the software development tool; and automatically forwarding the textual command to the installed version of the software development tool.

17. The computer-readable storage device of claim 16, wherein the operations comprise:

automatically establishing a shell alias which matches at least a portion of the textual command to a development tool autoloader; and based on the shell alias being automatically established, automatically mapping the textual command to the software development tool using the development tool autoloader.

18. The computer-readable storage device of claim 16, wherein the operations comprise:

automatically establishing an environment path variable or a search path definition which specifies a location of a development tool autoloader; and based on the environment path or the search path definition being automatically established, automatically mapping the textual command to the software development tool using the development tool autoloader.

19. The computer-readable storage device of claim 16, wherein getting the textual command in the command line interface includes getting a command line request to run a script which is written in a programming language;

wherein automatically installing the conformant version includes installing a runtime for the programming language; and wherein automatically forwarding the textual command includes forwarding an argument from the command line request to the runtime for execution.

20. The computer-readable storage device of claim 16, wherein the operations comprise:

automatically locating the conformant version of the software development tool by identifying and selecting the conformant version of the software development tool from a group which includes at least the following: a first version of the software development tool that does not require elevated privileges during installation, and a second version of the software development tool that includes a web assembly.

* * * * *